United States Patent [19]

Sheppard

[11] 4,088,063
[45] May 9, 1978

[54] POWER STEERING GEAR WITH SHORT PISTON AND FLUID BEARINGS

[76] Inventor: Richard H. Sheppard, 101 Philadelphia St., Hanover, Pa. 17331

[21] Appl. No.: 737,008

[22] Filed: Oct. 29, 1976

[51] Int. Cl.² .......................... F15B 9/10; F01B 9/00; F01B 31/10

[52] U.S. Cl. ........................ 91/378; 92/127; 92/136; 92/160; 92/DIG. 2

[58] Field of Search ........................ 91/378, 380, 422; 92/136, DIG. 1, DIG. 2, 160, 127

[56] References Cited

U.S. PATENT DOCUMENTS

| | | | |
|---|---|---|---|
| 2,941,514 | 6/1960 | Jablonsky | 91/378 |
| 2,975,764 | 3/1961 | Jablonsky | 91/378 |
| 3,075,500 | 1/1963 | Mazur et al. | 91/380 |
| 3,092,083 | 6/1963 | Sheppard | 92/136 |
| 3,242,824 | 3/1966 | Jablonsky et al. | 91/380 |
| 3,589,247 | 6/1971 | Kraakman | 92/127 |
| 3,896,702 | 7/1975 | Shah et al. | 91/422 |

FOREIGN PATENT DOCUMENTS

| | | | |
|---|---|---|---|
| 1,966,911 | 4/1975 | Germany | 92/136 |
| 2,405,573 | 8/1975 | Germany | 92/136 |

*Primary Examiner*—Paul E. Maslousky
*Attorney, Agent, or Firm*—Lowe, King, Price & Markva

[57] ABSTRACT

An integral power steering gear with a valve in the piston is provided having a short piston and cylinder to conserve space and weight. The input shaft is mounted on a bearing carried by an inwardly projecting annular portion on the bearing cap. The projecting portion mates with a recess in the end of the piston when the piston is moved to the full extreme in that direction. The valve guide pin has been relocated at the input shaft end of the valve where maximum support of the valve is realized and improved reversibility of the valve under all conditions is gained. In the bearing cap, both a high pressure seal and a low pressure weather seal are provided. An insert ring between the two seals serves as backup to the high pressure seal. In an alternative embodiment, the insert ring may be tapered toward the inside of the gear to allow use of a thin wiper-type seal. Lubricating grooves in the piston adjacent the output rack provide fluidized bearings to counteract the force of the fluid bearing provided on the top of the piston at the pressurized input slot. Dual feed passageways extending to opposite ends of the piston have connecting ports drilled from opposite sides of the piston to add further lubrication, but also prevent cross-bleeding between the ports.

28 Claims, 9 Drawing Figures

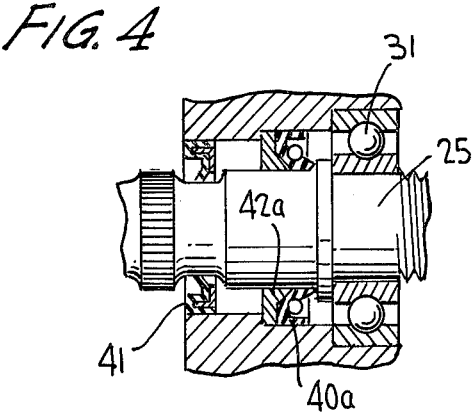
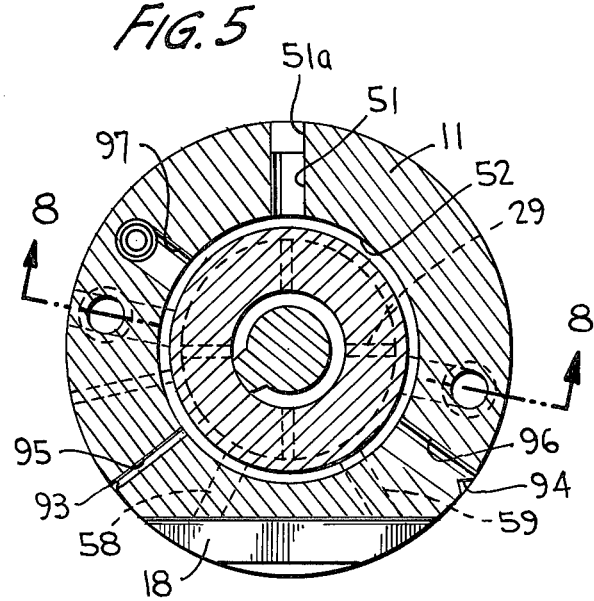
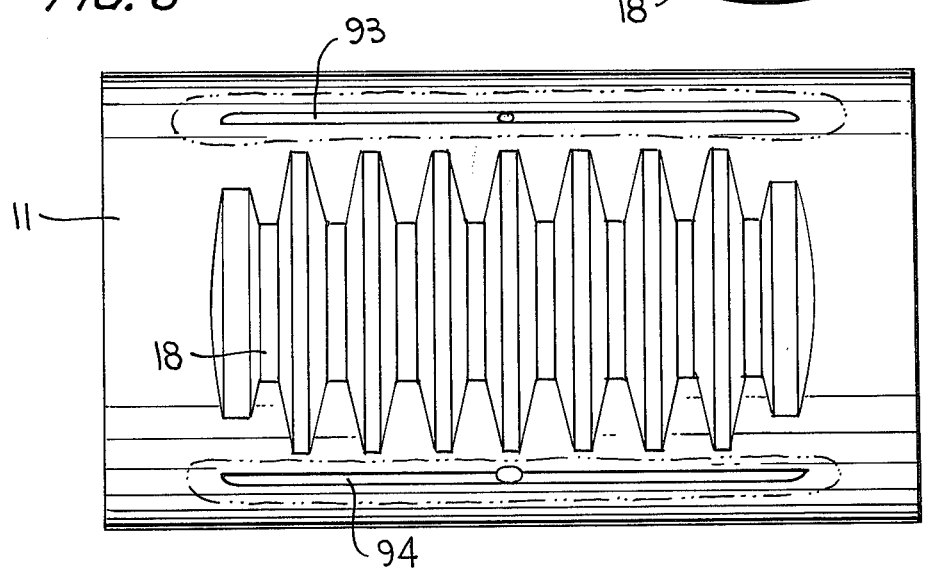
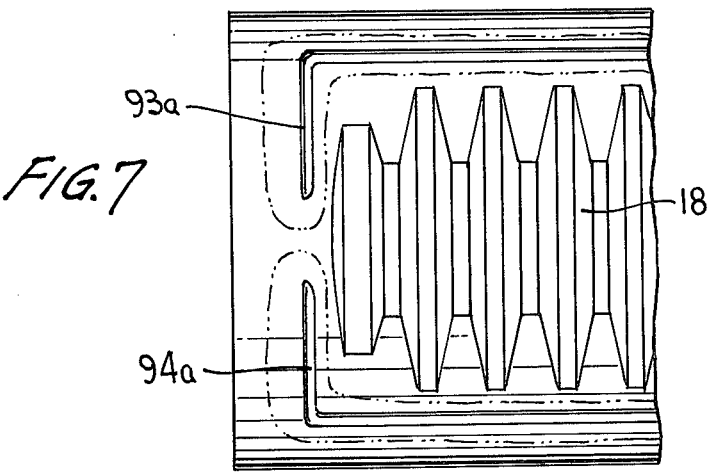

1

POWER STEERING GEAR WITH SHORT PISTON AND FLUID BEARINGS

FIELD OF THE INVENTION

The present invention relates to integral power steering gears, and more particularly, to a power steering gear with features allowing maximum manufacturing and operating efficiency with a short piston design.

BACKGROUND OF THE INVENTION

The power steering gear with the distributing valve in the piston, as disclosed and claimed in my previous basic mechanical U.S. Pat. No., Sheppard, 3,092,083, Piston For Power Steering System, has been a highly successful design and, in fact, is reputed to have the highest efficiency and reliability, and the lowest manufacturing cost in the industry. The basic design has been utilized in several models and sizes since its introduction in the early 1960's. Certain refinements, some of which are patented, have been made over the years in the Sheppard Power Steering System, but up until now the basic design of the piston and the steering gear has remained substantially the same.

Over the past few years, automotive manufacturers, including truck manufacturers, have increasingly been making the space under the front end of the vehicle more and more crowded with the addition of more accessory equipment, and larger and stronger axles, engines and other components. Compounding the space problem, has been the need to trim weight from a given size vehicle in order to increase the payload and to minimize cost and fuel usage. Truck manufacturers have included in their redesigns, shortening the chassis of the vehicle, and particularly the front end. All of this has inevitably led to engineering difficulties in effecting the mechanical interconnection of the steering shaft of the vehicle to the input shaft of the steering gear. That is, the space between the mating ends of the shafts has been so shortened and otherwise crowded that universal joints on standard steering gears are not longer workable, thereby forcing the need of alternative joints, such as the more expensive miter gear boxes.

Thus, the need has arisen for reducing the size and weight of the power steering unit, and particularly for shortening the input shaft end, while at the same time increasing its efficiency to handle the larger and larger vehicles with greater payloads.

Other major areas of change needed to accomplish the desired improved results in my new power steering gear are: (1) improving the manufacturing capability and efficiency through change of structure, particularly in the piston and bearing cap; (2) providing improved reversibility in the valve; (3) providing improved reversibility in the operating piston; and (4) providing structure for full volume fluid transfer without unwanted bleeding between high and low pressure feed ports.

OBJECTIVES OF THE INVENTION

Thus, it is one object of the present invention to provide a power steering system utilizing a shortened piston and housing to obtain new space efficiency over comparable models before.

It is another and more specific object of the present invention to provide a power steering gear with a valve in the piston wherein the effective length is shortened by providing the input shaft supported on an inwardly projecting portion of the bearing cap fitting within a recess in the piston when the piston has traveled to the bearing cap end.

It is another object of the present invention to provide a steering gear, as described, exhibiting increased operating efficiency with superior reversibility (change or beginning of movement) of the piston and the valve within the piston.

Other more specific related objects of the present invention are (1) to provide improved reversibility of the valve through optimum positioning of the valve guide pin and (2) to provide fluid bearing grooves on the underside of the piston opposite the pressurized fluid input groove to balance the opposing forces and provide lubrication thereby improving the reversibility of the piston.

It is still another and related object of the present invention to provide lubricating ports associated with the pressure feed passageways and locate the same in order to eliminate unwanted bleeding between the high pressure and the low pressure fluid.

It is still another object of the present invention to improve manufacturing techniques in several areas of the steering gear and including a technique for machining the fluid ports and passageways in the piston with the least number of drilling operations, and machining in one machine tool set-up the bearing cup for integral mounting of both a high pressure seal and an external weather or salt seal.

BRIEF DESCRIPTION OF THE INVENTION

The several aspects of the present invention including the structural changes for minimizing the size and weight of the unit and for increasing the machining efficiency, and the changes for improving the reversibility of the moving parts are considered to work in concert to provide an improved power steering gear meeting the demands of present day requirements. To physically fit the power steering unit of the present invention in a more compact space, and particularly to increase the distance between the input shaft of the steering gear and the mating end of the steering column to allow simpler interconnection, the valve within the piston of the steering gear has been moved to approximately the center of the piston allowing a recess to be formed in the bearing cap end of the piston. This allows the bearing for the input shaft to be mounted on an inwardly projecting portion of the bearing cap.

The stepped mounting bore for the bearing, the bearing locking ring and both the high pressure and weather seals may be machined from a single side in a single machining setup. This is made possible by using an insert ring to back up the high pressure seal; the ring forming the shoulder between the high pressure seal and the grease chamber for the outer weather seal.

The distribution or flow dividing valve within the piston is threaded in engagement with the input shaft at the bearing cap end and the valve guide pin is positioned in this region where maximum support of the valve is provided. The reversibility, or the ability of the valve to break loose from a centered position, is improved under these conditions since the guide pin and the mating groove are free to slide with minimum resistance. The effect of slight deflections of the parts that may be caused during periods of high dynamic torquing of the steering gear are negated by the new structure; i.e., the guide pin is located substantially opposite the output gear with the input shaft being in threaded engagement with the valve adjacent the pin.

In order to obtain full piston working area when the piston is moving away from the bearing cap end, high volume bypass ports are provided radially through the valve and communicating directly with the interior of the piston. The bypass ports are provided beyond the input shaft threads toward the interior of the piston. Direct maximum fluid flow is assured and thus maximum reversibility and responsiveness of the piston is realized.

The reversibility of the piston is further enhanced by providing fluidized bearing areas along the underside of the piston adjacent the rack. These areas are created by longitudinally extending grooves to which high pressure fluid is supplied by connection with the high pressure fluid inlet passage. These pressure areas are on the side opposite the inlet passage and thus offset the force of the fluid bearing created by the inlet passage and the feed slot on the top of the piston. The forces on the piston are thus substantially balanced and this positive lubrication virtually suspends the piston, significantly improving the ability of the piston to respond when an input signal is provided.

For additional improvement in reversibility, the structure of the longitudinal feed passageways has been changed. I have first provided for a greater volume of fluid flow, which enhances the responsiveness by allowing the fluid to move to and from the ends of the piston quicker. To do this, at least a pair of feed passageways are provided to each end of the piston with a connecting passageway portion through the annular supply groove of the valve. To simplify manufacturing, a single drilled hole through the piston forms the connecting portions. By drilling from opposite sides for the two connecting passageway portions, the open lateral ports provide balancing lubrication on the two sides of the piston. Added to the fluidized bearings on the top and bottom, the piston is now substantially suspended on fluidized bearing areas around its periphery. This has the effect of minimizing the break-loose force necessary to move the piston from a static position each time a steering correction is to be made. With the ports spaced apart, the further advantage of preventing unwanted bleeding between high and low pressures is obviated.

In an alternative form of the piston, the bearing grooves on the bottom of the piston may extend around the ends of the rack. The area or print of fluidized bearing provided by the grooves is spaced from the rack a distance sufficient to prevent any undue bleeding to the low pressure chamber enclosing the output gear.

Each of the fluidized bearings is self-correcting, in that an increased force on one side of the piston will cause a proportional increase of pressure in the fluid bearing on the opposite side.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DESCRIPTION OF THE DRAWINGS

FIG. 4 is a detailed cross-sectional view of an alternative form of high pressure seal on the input shaft;

FIG. 5 is a cross-sectional view taken along line 5—5 of FIG. 1 showing various ports and passageways in the piston;

FIG. 6 is a bottom view of the piston showing the fluid bearing grooves;

FIG. 7 is a cutaway bottom view of the piston showing an alternative form with bearing groove extensions;

DETAILED DESCRIPTION OF THE PREFERED EMBODIMENT

Figure 1:
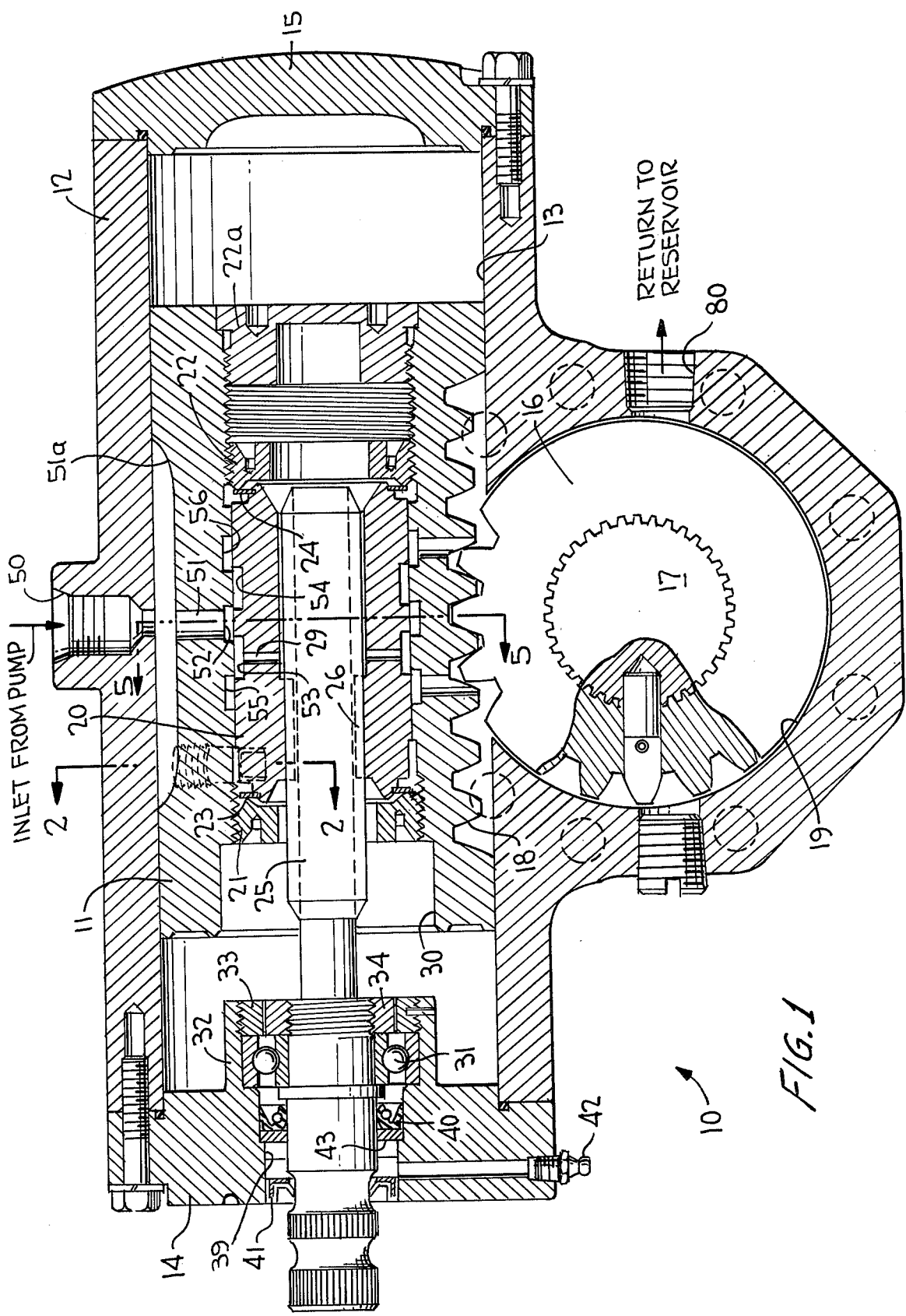
FIG. 1 is a cross-sectional view taken along the longitudinal axis of the power steering gear showing the new short piston and related structure.

For a more complete understanding of the preferred embodiment of the invention shown to disclose its salient features, reference is now specifically made to the drawings described above. Starting with FIG. 1, a power steering gear 10 has been shown in fully cross section. The gear 10 comprises basic parts in which structural changes have been made to both improve the operating efficiency and to minimize the manufacturing cost, as will be seen more in detail later. To help in understanding these several features of the invention, the basic parts of the gear have been numbered as follows: operating piston 11; gear housing 12 forming the cylinder 13; bearing cap 14 at a first end of the cylinder; and cylinder head 15 at the opposite or second end; output gear 16 on output shaft 17 operated by rack 18 on the piston 11; and low pressure exhaust chamber 19 surrounding the output gear 16.

In accordance with the present invention, a reciprocating spool-type distributing valve 20 within the piston 11 has been located at substantially the center of the piston almost directly over the output gear 16. Retaining rings 21, 22 at opposite ends of the valve 20 center the valve between calibrated washer springs 23, 24 and serve to reinforce the piston at points equally spaced from the ouptut pinion 16, as can clearly be seen in FIG. 1. Piston end cap 22a provides further reinforcement and closes the end of the piston.

Figure 2:
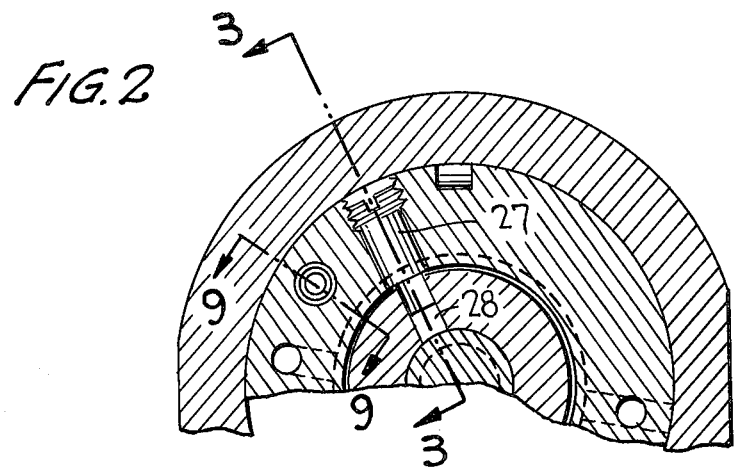
FIG. 2 is a partial cross-sectional view taken along line 2—2 of FIG. 1 illustrating the position of the new valve guide pin.
Figure 3:
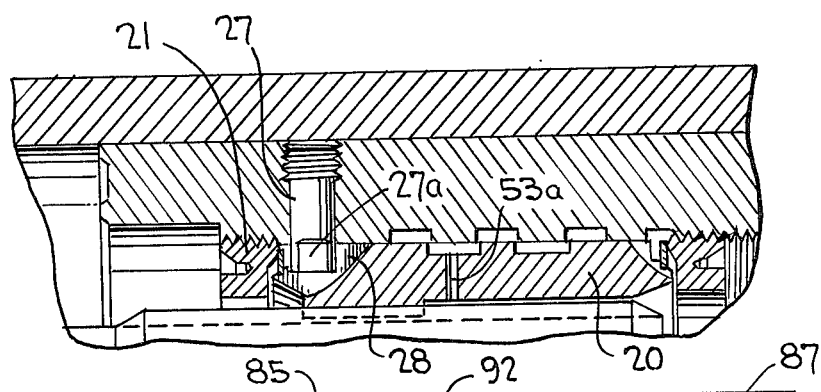
FIG. 3 is a partial cross-sectional view taken along line 3—3 of FIG. 2 showing the valve guide pin from another perspective.

Input shaft 25 is threaded and threadedly engages the valve 20 at threads 26. Because of the presence of the threads 26, the centering of the valve 20, plus the fact that the pin 27 is almost directly opposite the rack 18 and output pinion in the vertical plane (see FIGS. 1 and 2), the valve is more fully stabilized in the piston and substantially free of outside deflection forces that may be caused by very high torquing during dynamic operation of the gear. Note that retaining ring 21 adjacent the bearing cap that reinforces the piston is located in close proximity to the guide pin 27. In short, I have found that the threaded end of the valve adjacent the input shaft 25 (bearing cap 14 end of the piston) makes a more ideal position for guide pin 27 (see also FIGS. 2 and 3).

The guide pin 27 has a flattened area 27a that operates in a guide groove 28 formed in the nose of the valve toward the bearing cap end. Because of the great stability of the valve particularly in this section, the friction between the flattened surface 27a and the groove 28 is minimized even under high torque conditions. The valve is more easily reciprocated than heretofore when the pin was located adjacent the opposite end of the valve and in a plane approximately 90° from the rack. With the new structure, the pin 27 being positioned substantially opposite the output gear 16 (see FIG. 2), slight lateral deflections on the valve during the high torque periods has no effect on the free sliding movement within the mating groove 28. The reversibility is improved since the break-loose level of force for the valve through operation of the input shaft 25 is held constant under the wide range of loads on the gear.

Just beyond the threads 26 toward the interior of the piston 11, is provided a plurality of bypass ports 29 that serve to equalize the pressure within the interior of the piston with that present in the first end (bearing cap end) of the cylinder 13. This means that the full surface area of the piston adjacent the first end is made effective for power output; i.e., the inside face of cap 22a corresponding to the cross section of the input shaft 25 has full hydraulic pressure acting against it and is thus operative to provide output force. The composite size of the ports 29 is sufficient to allow the full volume transfer of fluid in order to provide still better reversibility of the piston during dynamic or unbalanced operation of the piston.

By the physical movement of the distributing valve 20 toward the center of the piston in my new steering gear, the effective length of piston 11 has been reduced. Most importantly, the bearing cap 14 has as a result of this structural change been able to be moved inwardly giving additional space for connection of the steering column by use of a simple universal joint connection. Specifically, a recess 30 is formed in the first end of the piston 11, which in turn allows bearing 31 for the input shaft 25 to be supported on an inwardly projecting annular portion 32 mating with said recess 30 when the piston has moved to full excursion toward the bearing cap end. Retaining nuts 33, 34 cooperate with the outer and inner races of the bearing 31, respectively. The reduction in size and these attendant advantages are readily apparent by comparison of FIG. 1 of the present drawings with FIG. 1 of my previous U.S. Pat. No. 3,092,083, mentioned above.

The center bore 39 of the bearing cap 14 that supports the bearing 31 advantageously houses both an inner high pressure seal member 40 and an outer weather or salt seal 41. Grease may be packed between the seals via grease fitting 42. Of importance, is the fact that all of the steps in the bore 39 are in the same direction so that during machining, the internal machining operation can be performed from one side of the bearing cap 14. This is made possible by utilizing an insert backup ring 43 between the seals and forming a full shoulder against which the high pressure seal 40 is held. The backup ring is installed as a separate piece and this allows the full shoulder to be provided without requiring machining of the bearing cap from both sides during the manufacturing operation. The three basic bore diameters of bore 39 have a minimum differential so as to minimize the diameter of the projecting portion 32, which in turn allows maximum structural strength in the first end of the piston 11 around the recess 30.

With the insert backup ring concept, an alternative form of high pressure seal is feasible. Thus, in FIG. 4, the annular backup ring 43a is made with a cross-sectional incline directed toward the inside of the gear. A low cost and highly efficient wiper seal 40a of substantially the same thickness around the full periphery may now be provided. The internal high pressure holds the seal against the incline as the inner lip seals against the rotating shaft. As in the standard seal, a garter spring is provided.

From the foregoing, it can be seen how the movement of the valve toward the center of the piston and relocation of the guide pin 27 and redesign of the bearing cap 14 not only provides improved operation of the valve in terms of reversibility and improves the manufacturing process, but also ideally attains the objective of providing an integral power steering gear with a valve in the piston wherein the piston and the gear itself is effectively shortened. Coupled with these advantages, are additional concepts relating to fluid flow and transfer within the steering gear of the invention and fluid bearings to support the piston that enhance the efficiency of my new steering gear design, as will be described below.

Referring again to FIG. 1 of the drawings, the pressure source or pump (not shown) is connected to the steering gear 11 through the input orifice 50 from which extends a fluid inlet passage 51 with slot 51a to allow uninterrupted feed at any position of piston travel along the cylinder 13. The passage 51 connects to annular groove 52 in the bore of the piston at the center of distribution valve 20. Annular grooves 52, 54 in the outer face of the valve 20 split the incoming high pressure fluid from groove 52 into two equal parts when the gear is in the standby or balanced condition. Outer annular grooves 55, 56 provide for exhaust communication of the flow through exhaust passages 58, 59 (see FIG. 5) at the bottom of the piston to exhaust chamber 19. Outlet orifice 80 returns the exhausted fluid to the system reservoir (not shown).

Figure 8:
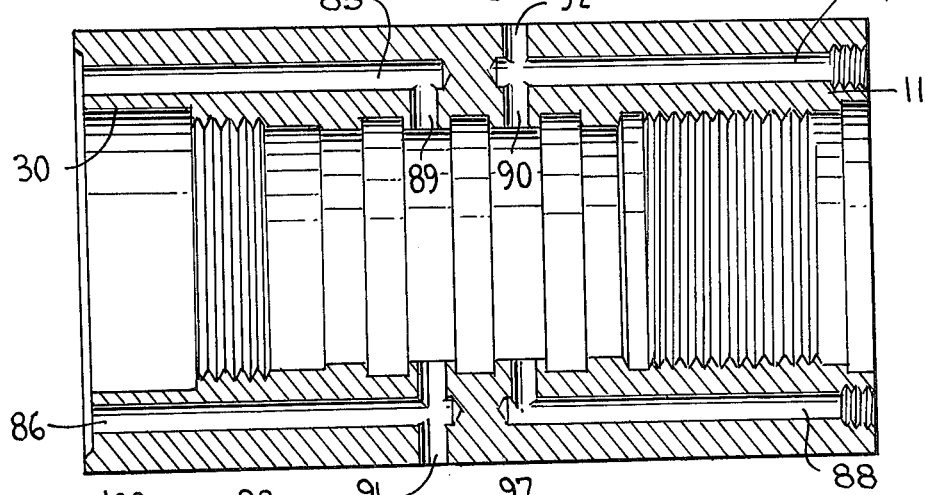
FIG. 8 is a cross-sectional view taken along line 8—8 of FIG. 5 (with the valve removed for clarity) and showing the high volume transfer passageways and opposite lateral porting for the piston.

The annular grooves 53, 54 also provide communication with the main longitudinal feed passageways that direct fluid to and from the opposite ends of the piston 11 and the cylinder 13. Feed passageways 85, 86 (FIG. 8) serve to transfer fluid to and from the first end or the bearing cap end (lefthand end as shown in FIG. 1). Passageways 87, 88 serve to feed the hydraulic fluid to and from the opposite end of the piston and cylinder. When the flow is equally split, substantially the same pressure fluid fills all four passageways and continuously exhausts through grooves 55, 56 and passages 58, 59 so that the piston remains in the balanced condition.

The connection between the passageways 85, 86 and 87, 88 with annular feed grooves 53, 54, is made by novel connecting passageway portions 89, 90, respectively. As can best be seen in FIG. 8, the lateral passageway portions 89, 90 do not extend all the way through the piston 11 and are drilled in from opposite sides. This in effect provides two lateral ports 91, 92 (with the annular grooves 53, 54 in the middle), said ports opening to opposite sidewalls of the piston 11. This arrangement is highly effective to allow the required large volume of flow of hydraulic fluid to and from the ends of the cylinder during dynamic operation of the gear.

For example, assuming that steering is required calling for movement of the piston 11 toward the bearing cap end, the valve 20 is moved to the left (FIG. 1). The flow division is immediately unbalanced with the high pressure fluid flowing through the annular feed grooves 54, the divergent sections of portion 90 and feed passageways 87, 88 to the righthand end of the piston building up pressure causing the piston 11 to instantaneously move to a new position where the flow is once again equally divided. As the piston 11 is moving, tracking the movement of the valve 20, the lefthand end of the cylinder 13 is being just as rapidly exhausted through full volume feed passageways 85, 86, connecting passageway portion 89, annular groove 53, annular exhaust groove 55 and exhaust passage 58 to the exhaust chamber 19. Thus, the reversibility, that is, the ability of the piston to move quickly and accurately to a new position (thereby effecting steering action) in response to an input signal from the input torque applied to shaft 25, is enhanced by this one aspect of my invention concerning the desirable full volume fluid flow.

The same feature is also important for another reason. As the piston 11 is held by and reciprocates in the cylinder 13, it will be realized that the mouth of the lateral ports 91, 92 are closed by the cylinder wall. A very limited amount of fluid squeezes out into this space between the piston and cylinder walls under the high pressure supplied by the pump. This squeezing of the fluid radially outward around the mouth of these ports forms a fluid bearing that lubricates, and in effect supports the sides of the piston in an efficient manner.

This lubrication and support particularly makes the initial static friction of the piston 11 more easily overcome, thus further improving the reversibility of the piston 11. As steering occurs, the pressure in the connecting passageway portions 89, 90 is of course temporarily unbalanced. Unwanted bleeding between the mouths of the ports is however prevented by the ports 91, 92 being drilled from opposite side of the piston 11 and thus sufficiently spaced apart to prevent this.

Additional fluidized bearings are provided along the upper and lower portions of the piston 11. The incoming pressurized fluid is distributed to the valve 20 within the piston at any location of the piston along the cylinder 13 by the longitudinally extending distribution slot 51a. High pressure fluid from the orifice 50 fills the slot 51a and tends to form a fluid bearing similar to that described above with an area or print of effectiveness slightly larger than the perimeter of the slot. The pressurized fluid filling this bearing area creates a lateral force on the top (FIG. 1) of the piston toward the output pinion 16 at the bottom. In the dynamic or unbalanced state of operation, the output gear 16 operating against the rack 18 tends to offset this force. However, at other times, such as during a static or balanced condition (no steering action), the force tends to push the bottom of the piston against the bottom wall of the cylinder 13.

In accordance with my invention, I have found that this lateral (or downward) force on the piston 11 is best overcome or countered by providing fluidized bearing grooves extending longitudinally along the sides of the rack 18 adjacent the bottom of the piston. The grooves are designed to provide limited pressure areas (see dashed line outline of FIG. 6) to perfectly counter or balance the force generated by the pressure area around the distribution slot 51a described above. Further, the forces are self-correcting in that as the close tolerance distances between the two sliding surfaces lessens the slightest amount, such as by the added action of the gear 16 against the rack 18 tending the squeeze the upper fluid bearing around slot 51a, the back pressure of fluid in the slot increases, and in turn, this increases the effective countering force of that fluid bearing, as required. The pressure is varied in reverse proportion to the space between the piston and the cylinder walls.

The ability of the piston to overcome static friction is now greatly enhanced, since the piston 11 now has fluid bearings around substantially the full perimeter of the piston. The ports 91, 92 and the bearing grooves 93, 94 are sufficiently spaced from each other and from the low pressure area around the rack 18 and the ends of the piston, so that insignificant bleeding between high and low pressure points is experienced. There is thus no measurable loss of available working fluid pressure to be converted into steering action.

From tests, the efficiency of the steering gear (measured in terms of reversibility, or break-loose of the piston to generate steering action) utilizing these features of my invention, has been increased approximately 12% to 20%. The greatest increase in efficiency 15%-20% is gained under what is known in the art as "lugging" conditions, such as a truck with idling gasoline engine and a fully loaded front axle steering in deep mud while standing still. In more normal driving conditions with the vehicle moving at a moderate speed on pavement, the lower, but still highly significant percentage increases are obtained.

As shown in FIG. 7, an optional fluidized bearing groove can include extensions 93a, 94a extending around the ends of the rack 18. This gives a larger bearing surface area including additional areas across both ends of the piston, and under certain conditions, this serves to enhance the reversibility by further reducing the static friction of the piston 11.

Figure 9:
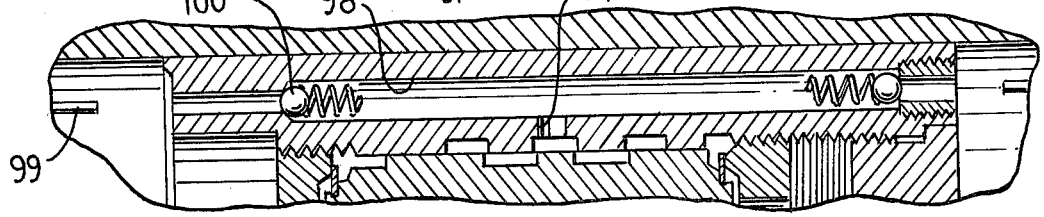
FIG. 9 is a partial cross-sectional view taken along line 9—9 of FIG. 2 illustrating the pressure relief or blowdown structure of the gear and the fluid connection with the annular supply groove.

As can be seen in FIG. 5, the bearing grooves 93, 94 are V-shaped in cross section. The grooves are fed through feeder passages 95, 96, respectively. These passages communicate with the input annular groove 52, as shown by the cross section of FIG. 5. The annular groove 52 is also in communication with the relief transfer passage 97, which in turn connects with the longitudinally extending blowdown passage 98 (see FIG. 9). At the limit of travel of the piston toward either end of the cylinder, a stop member 99 unseats a ball valve 100 allowing pressure in the groove 52 to be dumped through the appropriate feed passageways to the exhaust chamber 19.

When the steering gear is thus in the full travel position in either direction, the pressure in the fluid bearings around the piston is equalized but lower (at substantially exhaust pressure). As the piston is moved free of the stop 99, the valve 100 will be closed and the sides of the piston will once again be fully lubricated.

To provide the most efficient manufacturing of the piston 11, the feeder passage 96 is radially aligned with the transfer passage 97 so that only a single drilling operation from one side is required. As shown in FIG. 6, the narrow groove 94 limits the actual fluid flow and maintains the print of an equal size with that created by the corresponding groove 93 on the opposite side of the rack 18.

From the foregoing, it can be seen that the structural aspects of my new power steering gear provide substantial benefits in terms of being more compact and lighter while at the same time being more proficient in transforming the hydraulic pressure into a steering force for a vehicle. The size of the piston 11 and the housing 12 has been effectively shortened and the bearing cap 14 has also been reduced in its dimension outside the unit by use of the inwardly projecting portion 32 for mounting the input shaft bearing 31.

The relocation of the guide pin 27 brings about new efficiencies in terms of reversibility of the valve 20. The guide pin 27 is positioned opposite the pinion 16 and in the area of greatest reinforcement and stability adjacent the threaded engagement 26 with the input shaft 25. Bypass ports 29 in the valve 20 provide fluid transfer to the interior of the cylinder to assure operation of the pressure fluid against the full face of the piston 11 in both directions.

Lateral ports 91, 92 provide lubrication to the sides of the piston and fluidized bearing grooves 93, 94 lubricate the bottom of the piston 11 to counterbalance the force of the fluid pressure bearing around the inlet passage 51 and fluid distribution slot 51a. Fluid bearings spaced around the piston in this manner, greatly enhance the ability of the piston to break loose for steering action and thus operate in the most efficient manner.

In this disclosure, there is shown and described only the preferred embodiment of the invention, but, as aforementioned, it is to be understood that the invention is capable of use in various other combinations and environment and is capable of changes or modifications within the scope of the invention concept as expressed herein.

What is claimed is:

1. An integral power steering gear having a reciprocating power piston in a cylinder, a valve within the piston to selectively distribute pressurized fluid to a first and second end of the piston within the cylinder for steering action, a steering input shaft operatively engaging the valve at least adjacent said first end of said piston, an output means in engagement with said piston, the improvement comprising a bearing and bearing cap having an inwardly projecting annular portion supporting said input shaft adjacent the first end of said piston, retaining means for said bearing, said annular portion extending a distance substantially equal to said bearing and said retainer means, the valve within the piston being substantially centered in the piston opposite said output means with retaining means adjacent its ends, and a recess adjacent the first end of said piston for mating with the annular projecting portion of the bearing cap whereby the length of the power steering gear with the valve within the piston is effectively reduced.

2. The power steering gear of claim 1 wherein is further provided bypass means for feeding fluid to the interior of said piston adjacent the second end to provide full piston working area.

3. The power steering gear of claim 1 wherein is provided guide means extending between the valve within the piston and the first end of the piston to guide the valve while preventing rotation.

4. The power steering gear of claim 2 wherein said bypass means includes bypass ports extending substantially radially through the valve and communicating directly with the interior of the second end of said piston.

5. The power steering gear of claim 1 wherein is further provided a stepped diameter central bore in said bearing cap, an internal high pressure seal assembly in said bore, said assembly including an insert backup ring and a high pressure seal member, said backup ring being installed as a separate piece into said bore of the bearing cap against a shoulder, whereby said bearing cap can be fully machined from only one side.

6. The power steering gear of claim 5 wherein is further provided an exterior weather seal mounted in said bore of the bearing cap adjacent the outer end, said weather seal being mounted at a lesser diameter portion than that provided for the high pressure seal, whereby to facilitate the machining operation from the inner side of the bearing cap.

7. The power steering gear of claim 5 wherein said backup ring is an annular wedge-shape ring, said wedge-shaped ring supporting a wiper seal at an inclined position toward the inside of the steering gear, said wiper seal being substantially the same thickness around the full periphery, whereby the wiper seal material is minimized.

8. An integral power steering gear having a reciprocating power piston in a cylinder, a valve within the piston to selectively distribute pressurized fluid to the ends of the cylinder for steering action, a steering input shaft operatively engaging said valve at least adjacent one end of said piston, a bearing and bearing cap supporting said input shaft adjacent said one of said piston, a recess in said one end to receive a portion of said bearing cap and said bearing and output means in engagement with said piston, the improvement comprising guide means extending between said piston and said valve to prevent relative rotation, said guide means being positioned closely adjacent said recess of said one end of said piston, whereby valve reversibility is enhanced by the guiding action occurring at the end of the valve where maximum support of said valve occurs.

9. The power steering gear of claim 8 wherein said input shaft has threads to engage said valve adjacent said one end, said guide means being adjacent the threads.

10. The power steering gear of claim 9 wherein said guide means comprises a flattened pin, said pin fitting within a guide groove formed in the valve.

11. The power steering gear of claim 9 wherein is provided bypass port means through to the interior of said valve beyond said threads to alternatively directly transfer high pressure and exhaust fluid to the interior of the piston.

12. The power steering gear of claim 9 wherein the valve is positioned approximately at the center of said piston and opposite said output means, retaining rings at the ends of said valve for locating the valve and strengthening said piston.

13. An integral power steering gear having a reciprocating power piston in a cylinder, a valve to selectively distribute pressurized fluid to the ends of the cylinder for steering action, output means on said piston means on one side of the piston to provide a lateral force and fluidized bearing groove means on the opposite side of the piston adjacent said output means for supplying high pressure fluid between the piston and the cylinder, whereby to provide a counterbalancing lateral force to substantially balance the force on the cylinder and to improve reversibility of the piston.

14. The power steering gear of claim 13 wherein is further provided passageway means for communication between each end of the piston and the valve and a pair of longitudinal feed passageways to provide increased capacity flow to the cylinder for improved reversibility, said feed passageways being separated around the piston, and a connecting lateral passageway portion for each pair communicating with said valve and forming a lateral port on one side of said piston, whereby pressurized fluid from the two ports substantially balances and lubricates opposite sides of the piston.

15. The power steering gear of claim 14 wherein said connecting passageway portions extend parallel to each other laterally through the piston, one portion forming the lateral port on one side of the piston and the other passageway portion forming its lateral port on the opposite side of the piston and spaced to prevent unwanted bleed from the high pressure to the low pressure passageways.

16. The power steering gear of claim 13 wherein said lateral force means includes a fluid bearing provided by a pressurized fluid inlet passage communicating with said valve, the fluid in the inlet passage being split in accordance with the positioning of the valve to the opposite ends of the working cylinder to provide steering action, said bearing groove means including grooves extending along the piston and forming fluidized bearings to offset the opposite force from the fluid bearing of the inlet passage, whereby said piston is suspended on fluid bearings for improved reversibility of the gear.

17. The power steering gear of claim 16 wherein said fluid inlet passage includes a longitudinally extending feed slot, the feed slot providing the fluid bearing along the piston parallel and substantially opposite the fluidized bearings provided by the bearing grooves on the opposite side of the piston, whereby to decrease the static friction particularly during times of break-loose piston movement at high torque demand of the steering gear.

18. The power steering gear of claim 13 wherein is further provided fluid blowdown means for operation when the piston reaches the end of travel in either direction within the cylinder, said bearing grooves including feeder passages communicating with the inlet passage and the blowdown means in order to maintain the pressure on opposite sides of the piston substantially equalized.

19. The power steering gear of claim 18 wherein the feeder passage of one of the fluid bearing grooves extends radially in-line with a relief transfer passage to the blowdown means, whereby the passages may be formed during the same manufacturing operation.

20. An integral power steering gear having a reciprocating power piston in a cylinder, a valve within the piston to selectively distribute pressurized fluid to the ends of the cylinder for steering action, feed passageway means in communication with the valve and opening at opposite ends of the piston, each passageway means having a lateral port providing a fluidized bearing on the outside of the piston adjacent the port, the ports for the opposite ends of the piston being spaced on opposite sides of the piston to prevent bleeding from the port having the high pressure fluid to the port having the low pressure fluid.

21. The power steering gear of claim 20 wherein said passageway means for each end of the piston includes at least a pair of longitudinal feed passageways to provide increased capacity flow to the cylinder for improved reversibility, the feed passageways of each pair being separated around the piston, and a connecting lateral passageway portion for each pair communicating with said valve and forming the lateral port on one side of said piston, whereby pressurized fluid from the two ports substantially balances and lubricates opposite sides of the piston.

22. The power steering gear of claim 21 wherein said connecting passageway portions extend parallel to each other laterally from one side through the piston and stopping short of the opposite side of the piston, one passageway portion forming the lateral port on one side of the piston and the other passageway portion forming its lateral port on the opposite side of the piston to lubricate and prevent bleeding from the high pressure to the low pressure passageways.

23. The power steering gear of claim 20 wherein is further provided a pressurized fluid inlet passage communicating with said valve, the fluid in the inlet passage being split in accordance with the positioning of the valve to the opposite ends of the cylinder to provide steering action, and fluidized pressure bearing means in said piston positioned on the side of the piston opposite from the inlet passage and communicating therewith at all times during operation of the gear, said bearing means extending along the piston to offset the opposite force from the fluid inlet passage, whereby said piston is suspended on fluid bearings for improved reversibility of the gear.

24. The power steering gear of claim 23 wherein said fluid inlet passage includes a longitudinally extending feed slot, the feed slot providing an elongated fluid bearing along the piston parallel and substantially opposite the fluidized bearing means provided on the opposite side of the piston, whereby to decrease the static friction particularly during times of break-loose piston movement at high torque demand of the steering gear.

25. The power steering gear of claim 24 wherein the bearing means includes bearing grooves extending longitudinally along the piston.

26. The power steering gear of claim 25 wherein is further provided groove extensions on said bearing grooves turning toward each other at the ends of the piston to provide increased fluid bearings.

27. The power steering gear of claim 25 wherein the feed slot providing a fluid bearing is located on one side of the piston and the bearing grooves on the opposite side, and the opposite lateral ports connecting the feed passageways being positioned approximately half way between around the periphery of the piston to provide fluid bearings and lubrication around a substantial portion of the piston during operation.

28. The power steering gear of claim 25 wherein is further provided fluid blowdown means for operation when the piston reaches the end of travel in either direction within the cylinder, said bearing grooves including feeder passages communicating with the inlet passage and the blowdown means in order to maintain the pressure on opposite sides of the piston substantially equalized, a relief transfer passage to feed said blowdown means, one of said feeder passages radially in-line and the same diameter being drilled in the same single manufacturing operation.

* * * * *